INVENTOR
ERIK DUYVENÉ DE WIT

BY
*A. B. Foster*
ATTORNEY

Patented May 19, 1953

2,638,840

UNITED STATES PATENT OFFICE 2,638,840

APPARATUS FOR MAKING COFFEE AND LIKE INFUSIONS

Erik Duyvené de Wit, Amsterdam, Netherlands

Application April 19, 1951, Serial No. 221,758
In the Netherlands April 25, 1950

5 Claims. (Cl. 99—305)

My invention relates to an apparatus for making coffee and like infusions. My new apparatus is of simple construction and can be made in mass-production.

My apparatus comprises an outer casing, open at the top and provided with a cover, the outer casing to be used as a water tank into which boiling hot water is to be poured. Further it contains a box of which the bottom is perforated so that it can be used as a screen, the upper part of this box being open. The box is fixed in the bottom part of the outer casing in such a way that the screen lies substantially below the bottom part of the outer casing. A second inverted-box-like part with its top above the open and upper part of the first box fits closely over this first box leaving a small clearance between the outside of the first box and the inside of the second box-like element. The second box-like element has a top with a downwardly arched or curved central portion forming a depression in its middle portion and is provided with a U-shaped tube fixed in an opening in the lowest point of the depression, the other end of the U-shaped tube terminating at the level of the upper open end of the first box.

The U-shaped tube serves as a deaerating means and in a later stage as a syphon.

Figure 1:
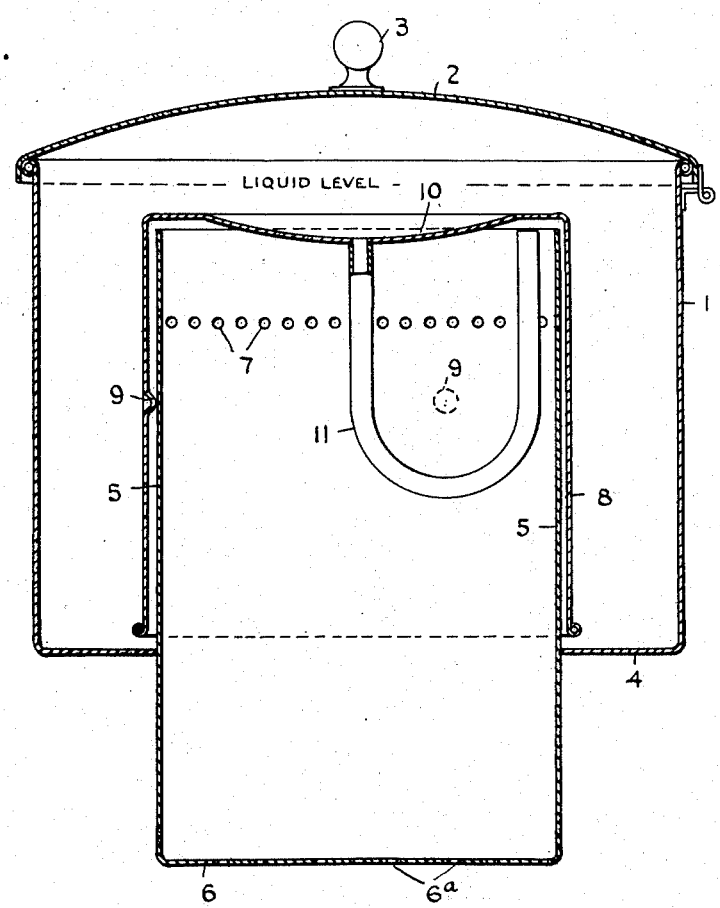

Further features of my invention will appear from the following description of a preferred embodiment of the apparatus according to my invention wihch is described with reference to the annexed drawing, in which:

Fig. 1 is a vertical section of the apparatus, and

Figure 2:
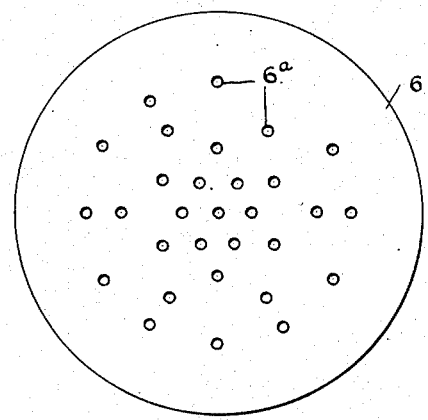

Fig. 2 a view of the bottom of a part of the first box.

According to this example the apparatus comprises a metallic outer casing 1 which may be circular in cross-section however, this cross-section may have the shape of an ellipse, or of a square, or of a rectangle. The casing 1 is open at the upper part and can be closed by a cover 2, e. g. a hinged cover, possessing in its central part a knob 3.

Through the bottom 4 of the casing 1 extends a box 5 having a cross-section in the shape of a circle and being open at the upper part. The box 5 extends some 4–6 centimetres below the bottom 5 of the casing 1 and is provided with a screening-bottom 6, having small perforations 6a. This extension of the box 5 fits in the coffee-pot to be delivered together with my apparatus, so that the latter may remain on the coffee-pot when pouring out the coffee without any danger that the apparatus falls.

At a certain distance below the open upper edge of the side wall of the box 5 a row of perforations 7 is arranged.

A second inverted-box-like element 8 fits loosely over the box 5 with a small clearance, say of 2 millimetres, the vertical length of the box-like element 8 being a little less than the vertical length of the part of the box 5 above the bottom 4 of the casing 1. The diameter of the element 8 is approximately 2 millimetres larger than the diameter of the box 5 so that there remains a ring-shaped free space between the interior of the element 8 and the exterior of the box 5.

In order to maintain this free space and to prevent the lifting-up of the element 8 when in use this element 8 is provided with dents 9, preferably three dents at the same level.

The top of the box-like element has a downwardly arched portion or depression 10. In or near the lowermost part of this depression 10, an opening is provided in which one end of a U-shaped pipe or tube 11 (preferably a capillary tube) is fixed. This provides an open communication between the space in the inner box 5 and the depression 10 in the top of 8, this tube being located inside the outer box 8 and inside the top of box 5.

When using my apparatus the box 5 is half filled with ground roasted coffee-beans. Thereupon the element 8 is slid over the box 5 as far as possible and boiling water is poured into the casing 1 till the level of the water lies above the upper edge of the element 8, after which the casing 1 is closed by means of the cover 2. The extract or infusion as made, passes through the screening-bottom 6 into the coffee-pot (not shown). The extraction will take some 7 to 15 minutes, dependent on the fineness and the quantity of the ground coffee.

The water level will drop below the top of the element 8 and the water will enter into the ring shaped space between 8 and 5, rising upwards till it reaches the perforations 7. The head between the perforations 7 and the water level (in case the apparatus is filled with water) is such that the quantity of water entering the box 5 at any one time is just sufficient to moisten the coffee without the latter being caused to float. The capillary spaces or voids between the coffee particles are filled with water thus causing together a hydrostatic pressure in a downward direction which pressure is proportional to the height of the column of coffee containing water. The water charged with aromatic substances passes through the holes in the perforated bottom 6 and enters into the coffee-pot placed therebelow.

The working of the apparatus as a syphon is obtained as follows: the syphon-action is dependent on the formation of a vacuum (reduced pressure) above the coffee. This vacuum will be generated as follows: the water entering the box 5 will heat the air above the coffee causing an expansion of this air. This expanded air escapes through the capillary tube 11 into the space above 10. The air which has thus been driven out is replaced by water and water vapour. In the meantime the contents of the apparatus have cooled a bit. As the curve indicating the vapour pressure of water near its boiling point is rather steep, a small cooling will be sufficient to decrease the pressure of the water vapour above the ground coffee below the pressure of the atmosphere. The over-pressure under which air above the coffee escapes through the U-shaped tube gives way to a reduced pressure. In order to obtain a syphon action it is necessary to shut off the open connection through which air could escape in the beginning. This is achieved by the water automatically in the depression as explained below.

During filling the apparatus with water above the top of the box-like element 8 the central depression 10 has been filled with water. Due to the vacuum this water is sucked through the U-shaped tube 11 till the difference in the levels of the water in both legs of the U-shaped tube is so large that the difference in pressure between the outer atmosphere and the mixture of air and water vapour above the coffee is compensated. Further cooling will decrease the pressure further and also the differences between the water levels. Water is sucked through the openings 7, thus lowering the level of the water in the casing 1. This will continue till the difference between the levels of the water in the casing and the perforations 7 would become larger than the height of the water column in the free leg of the U-shaped capillary tube 11. At that moment all water present in the free leg is sucked out of tube 11 and the free communication between the air in the space above 10 and the space in 5 above the coffee is restored. So the syphon-action and also the extraction are stopped.

My apparatus has several advantages over the known apparatus of this kind. So it is very easy to use the same, as no supervision is necessary. The syphon-action is independent on the quantity of extract prepared already. It is possible to pour out the extract of coffee before the extraction will be completed, without the syphon-action being interrupted.

I claim:

1. An apparatus for making coffee and like infusions comprising an outer casing open at the top and provided with a cover; a box possessing a screening bottom and also open at the top, this box being fixed in the bottom of the outer casing, with one portion of said box above the bottom of such outer casing and another portion of said box below the bottom of said outer casing; a second inverted-box-shaped element fitting around said first box with a small clearance between said box and said element, such element terminating above the bottom of said outer casing and such element having a top with a downwardly arched central depression provided with an opening in the lowest part of said depression, in which opening an upright U-shaped tube is fixed in a liquid-tight manner, such U-shaped tube being within said inverted-box-like element.

2. An apparatus according to claim 1, in which the U-shaped tube terminates at approximately the level of the upper and open portion of the box possessing the screening bottom.

3. An apparatus according to claim 1, in which the U-shaped tube is a capillary tube.

4. An apparatus according to claim 1, in which a row of perforations is arranged thereon a short distance from the upper edge of the inner box.

5. An apparatus for making coffee and like infusions comprising a water tank open at the upper side within which a box is present, also open at the top, for receiving the ground coffee, terminating below the bottom of the water tank and bearing a screening bottom and fixed to the bottom of the water tank inverted-box-like element fitting around the first box with a small clearance, the lowermost end of the inverted-box-like element terminating a small distance above the bottom of water tank; the first box for receiving the coffee having located therein a U-shaped tube fixed in an opening in a downwardly arched central portion of the top of said inverted-box-like element, and said U-shaped tube terminating at the level of the open uppermost portion of the said box for receiving the coffee.

ERIK DUYVENÉ DE WIT.

References Cited in the file of this patent

UNITED STATES PATENTS

| Number | Name | Date |
|---|---|---|
| 578,910 | Borchers | Mar. 16, 1897 |
| 2,522,558 | Alvarez | Dec. 19, 1950 |

FOREIGN PATENTS

| Number | Country | Date |
|---|---|---|
| 639,158 | France | Mar. 5, 1928 |